H. M. CAKE.
TRANSMISSION GEARING.
APPLICATION FILED OCT. 12, 1909.
1,017,954.
Patented Feb. 20, 1912.
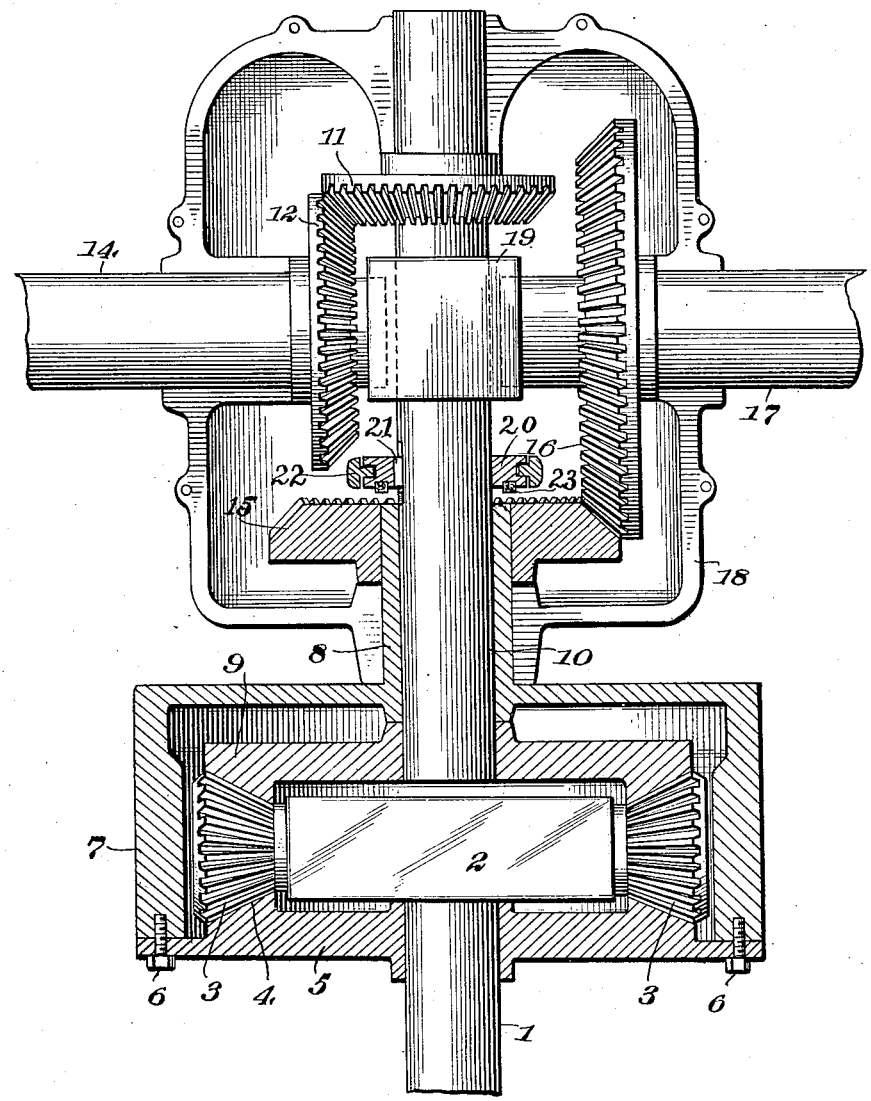
Witnesses
J. A. Bishop
Ernest F. Riley
Inventor
Horace M. Cake
By Geo. W. Ramsey,
Attorney

UNITED STATES PATENT OFFICE.

HORACE M. CAKE, OF WASHINGTON, DISTRICT OF COLUMBIA.

TRANSMISSION-GEARING.

1,017,954.         Specification of Letters Patent.     Patented Feb. 20, 1912.

Application filed October 12, 1909. Serial No. 522,248.

*To all whom it may concern:*

Be it known that I, HORACE M. CAKE, a citizen of the United States, and a resident of Washington, in the District of Columbia, have invented certain new and useful Improvements in Transmission - Gearing, of which the following is a specification.

This invention relates broadly to the art of gearing and specifically to transmission gearing.

The principal object of this invention is to provide a mechanism wherein power is transmitted from a driving shaft into two axially alined driven shafts.

Another object of the invention is to provide a mechanism whereby power may be taken from each side of a compensating gear mechanism and delivered on one side of a compensating gear mechanism.

A further object of this invention is to provide a power shaft and two driven shafts with all of said shafts in axial alinement, and compensating balancing gears between the two driven shafts.

A further object of the invention is to provide a mechanism wherein power is transmitted from a driving shaft into compensating gears and from said compensating gears into driven shafts, both of which are axially alined with the driving shaft.

A still further object of the invention is to provide a mechanism whereby power may be taken from a driving shaft and transmitted through compensating gears into gear mechanism in such manner that the torsional strains in the system are counter-balanced.

This invention which is believed to be broadly new, may be susceptible of structural changes, but a preferred form will be herein described and shown in the accompanying drawings, in which the figure is a plan view showing part of the mechanism in section.

In this invention the driving shaft, which may be connected to any type of engine or motor, terminates in a transmission head which carries on its periphery compensating pinions or beveled gears. These pinions mesh on one side with a beveled gear wheel which is fixedly secured to a short stub shaft axially alined with the driving shaft, and which is connected by means of beveled gears, with transmission shafts that may be connected to the road wheels of an automobile or any other similar mechanism through which power is utilized. The compensating pinions mesh on their opposite side with a beveled gear, mounted to rotate upon the engine shaft, and is fixedly attached to a gear casing that incloses the compensating gears and which terminates in an elongated tubular shaft encompassing the short stub shaft. The tubular shaft is also connected, by means of gear mechanism, with transmission or road wheel shafts. In my preferred form, the ratio of proportion between the beveled gear carried by the cylindrical shaft and its companion gear upon one transmission shaft, is proportionately the same as the beveled gear upon the tubular shaft and its companion beveled gear upon the other transmission shaft, in order that when the tubular shaft and the cylindrical shaft are revolved at the same rate of speed then the two transmission shafts will also revolve at the same rate of speed.

Referring more particularly to the drawings, the engine shaft 1, carries fixedly attached thereon a transmission head 2. Compensating gears, or beveled pinions 3 are mounted upon the periphery of the transmission head by means of any suitable bearing device, so that they may rotate upon the transmission head. In the drawing, I have illustrated a mechanism as showing but two compensating gears; it may be desirable to use three or more compensating gears, as that would more evenly transmit power from the transmission head. The compensating gears mesh with an annular beveled gear 4, which is formed integral with a face plate 5. The face plate 5 is bolted to a casing member 7 by means of stud bolts 6. The compensating gears 3 mesh upon their opposite side with a beveled gear 9, which is fixedly mounted upon a stub shaft 10. The outer end of the stub shaft 10, carries thereon a floating thrust bearing block 19, and also a beveled gear 11, which is in mesh with a beveled gear 12, that is fixedly mounted upon a transmission or road wheel shaft 14, This shaft is mounted in a bearing in the casing 18, and terminates in the thrust bearing block 19, which floats upon the cylindrical shaft 10. The casing member 7 terminates in a tubular shaft 8, which is mounted to rotate upon the stub shaft 10. This tubular shaft also carries at its extremity a beveled gear 15 fixedly mounted thereon, and which meshes with a beveled gear 16, rigidly attached to the transmission or road wheel shaft 17 that is also mounted to turn in a bearing in the casing member 18, and which terminates in the floating bearing block 19.

I have shown the bearings used in my device as being plain bearings. I desire it to be understood that ball-bearings may be substituted for a plain bearing in any part in my gearing structure.

The outer portion of the casing 7 is formed heavy in order that it may act as a fly wheel. In fact all of the gear mechanism within the casing 7 acts more or less as a fly wheel.

Where my invention is applied to automobile transmission mechanism to take the place of an ordinary differential mechanism, it often becomes desirable that the differential mechanism be rendered inoperative, in order that more or less power may be transmitted directly to either wheel from the driving shaft. For example, it frequently happens that one driving road wheel will be upon solid earth, while the other is in slippery mud. The result of this, providing a differential mechanism be operating between the two driving wheels, is that the wheel having a solid footing will stand stationary, while the wheel in the slippery mud will rotate. If it were possible to throw the differential mechanism out of operation, then power will be transmitted to the wheel on solid footing independently of the wheel in the slippery mud, and the machine could be driven forward and thus get out of the difficult situation.

In order to meet an exigency similar to that related above, I have provided a clutch mechanism which operates to clutch the tubular shaft to the cylindrical stub shaft in such manner that both shafts revolve as a unit, or in such manner that any rotation between the two shafts is resisted by the frictional contact of the clutch.

Referring more particularly to the drawing, the clutch member 20 is mounted upon the shaft 10, by means of a key 21, which is fixedly attached to the clutch member 20, and which is adapted to slide in a key way cut in the cylindrical shaft. This friction member is adapted to be operated by engaging members 22 that are connected through the casing 18 in a lever or a foot pedal (operative connections and foot lever not shown). The friction member 20 carries cork inserts 23, which are adapted to engage the face of the beveled gear wheel 15, which is fixedly mounted upon the tubular shaft 8.

As many changes could be made in the above described structure and many widely different embodiments of this invention could be made without departing from the scope thereof, the definite matter contained in the above description and shown in the accompanying drawing, is to be taken as illustrative and not in its limiting sense. I desire it also to be understood that the language used in the claims is intended to cover all generic and specific features of this invention herein described, and all statements of the scope of the invention which as a matter of fact might fall therebetween.

Having described my invention what I claim is:—

1. In a transmission gearing in combination, a driving shaft, a transmission head carried on said driving shaft, compensating gears on said transmission head, a face plate carrying a beveled gear thereon, a tubular shaft, a casing integral with said tubular shaft, a cylindrical shaft, a beveled gear carried upon said cylindrical shaft, transmission shafts, gear means for connecting said cylindrical shaft with one of the transmission shafts and gear means for connecting said tubular shaft with the other transmission shaft.

2. In a transmission gearing in combination, a driving shaft, a transmission head carried on said driving shaft, compensating gears upon said transmission head, a face plate carrying a beveled gear thereon, a tubular shaft, a casing attached to said tubular shaft, a cylindrical shaft and a beveled gear; the driving shaft, the tubular shaft and the cylindrical shaft all being in axial alinement.

3. A transmission gearing including a driving shaft, a transmission head, compensating gears carried by said transmission head, a driven shaft, a tubular shaft, said tubular shaft and said driven shaft both being on one side of said transmission head, a beveled gear operatively connected to said driven shaft, said beveled gear being on the same side of the transmission head as are the driven shaft and the tubular shaft, a second beveled gear on the opposite side of said transmission head and operatively connected with said tubular shaft.

4. In a transmission gearing in combination, a driving shaft, a cylindrical driven shaft, a tubular member surrounding said cylindrical driven shaft, compensating means operatively connecting said driving shaft with both the cylindrical shaft and the tubular shaft and clutch means between the cylindrical shaft and the tubular shaft.

5. In a transmission gearing in combination, a driving shaft, a transmission head, compensating gears carried by said transmission head, a cylindrical driven shaft, a tubular driven shaft, operative means connecting said tubular shaft with said compensating gears, operative means connecting said cylindrical shaft with said compensating gears and a clutch mechanism between said cylindrical shaft and said tubular shaft.

6. A transmission gearing including a driving shaft, compensating means, driven shafts on one side of said compensating means, the construction and arrangement of parts being such that the driving and the driven shafts all rotate in the same direction, and clutch mechanism between the driven shafts.

HORACE M. CAKE.

Witnesses:
E. F. RILEY,
M. B. NICHOLS.

Copies of this patent may be obtained for five cents each, by addressing the "Commissioner of Patents, Washington, D. C."